United States Patent [19]

Villarruel et al.

[11] 4,229,402
[45] Oct. 21, 1980

[54] FIBER OPTIC CONNECTION METHOD

[75] Inventors: Carl A. Villarruel, Alexandria; Thomas G. Giallorenzi, Springfield, both of Va.

[73] Assignee: The United States of America as represented by the Secretary of the Navy, Washington, D.C.

[21] Appl. No.: 925,727

[22] Filed: Jul. 18, 1978

[51] Int. Cl.³ .......................... B29H 9/12; B32B 31/06
[52] U.S. Cl. .................................... 264/262; 29/520; 264/296; 350/96.15; 350/96.20
[58] Field of Search ............. 29/520; 264/241, 176 R, 264/248, 262, 296, 249, 176 R; 350/96.15, 96.29, 96.20

[56] References Cited

U.S. PATENT DOCUMENTS

| | | | |
|---|---|---|---|
| 2,686,337 | 8/1954 | Kaufman | 264/248 X |
| 2,921,463 | 1/1960 | Goldfein | 264/241 X |
| 3,093,888 | 6/1963 | Huguley | 29/520 UX |
| 3,472,921 | 10/1969 | Fyfe | 350/96.29 X |
| 3,559,270 | 2/1971 | Beghi | 29/520 X |
| 3,655,275 | 4/1972 | Seagreaves | 350/96.20 X |
| 4,074,415 | 2/1978 | Stieff | 29/520 |
| 4,097,129 | 6/1978 | Wellington et al. | 350/96.15 |
| 4,147,407 | 4/1979 | Eichenbaum et al. | 350/96.29 X |

*Primary Examiner*—Charlie T. Moon
*Attorney, Agent, or Firm*—R. S. Sciascia; Philip Schneider

[57] ABSTRACT

An attachment tool and method for attaching a connector to a plastic-covered optic fiber, said connector formed with a bore slightly smaller than the covered fiber but slightly larger than the fiber core, the tool comprising a block of rigid material having a flat surface containing a straight groove running into and away from a central excision, the dimensions of the groove and excision being such that when the fiber is thread through the connector, and the connector is laid in the excision and the fiber in the groove, the fiber is substantially straight and centrally placed within the connector bore. A heater is used to heat the connector and soften the covering so that the fiber can be pulled through the bore by extrusion of the covering. The covering, which now fills the bore around the fiber core, is allowed to cool and harden, and the protruding fiber is cut off flush with the end of the connector.

1 Claim, 7 Drawing Figures

FIBER OPTIC CONNECTION METHOD

BACKGROUND OF THE INVENTION

This invention relates to optical fiber connectors and especially a method for terminating an optical fiber with a connector.

Several varieties of fiber optic connectors have been reported in the past. For the most part single-fiber connectors have been either too difficult to attach in the field or have been too expensive when attached in the factory. In general, it can be said that the difficulties are due to the accuracy with which the ends of the optical fiber wave guides must be aligned with each other. Typically, for step index fiber waveguides, center-to-center fiber displacements smaller than ±10 μm must be obtained and the connections must be rugged enough to maintain this alignment under field conditions. Future optical communications systems will require optical interconnections with throughput power loss lower than 0.5 db which requires an alignment accuracy greater than ±5 μm. The present invention can provide such accuracy.

SUMMARY OF THE INVENTION

The advantages of the present invention are obtained by stripping the coating and cladding from an optical fiber for some distance to leave a section of bare fiber; then stripping only the outer coating leaving a section of cladded fiber for some distance; threading the bare fiber section through a connector having a tip section which is a little too narrow to allow the cladded fiber section to pass through; heating the tip section so that the plastic cladding softens and pulling the softened section fully into the narrow tip; allowing the softened section to cool and harden whereby the cladding bonds itself to the connector tip; and cutting the fiber off at the end of the connector tip.

BRIEF DESCRIPTION OF THE DRAWING

FIGS. 1A and 1B are cross-sectional views of the optical fiber taken along lines A—A and B—B, respectively, in FIG. 1.

FIG. 5 shows details of one type of readily available and inexpensive connector.

DETAILED DESCRIPTION OF THE INVENTION

Figure 1:
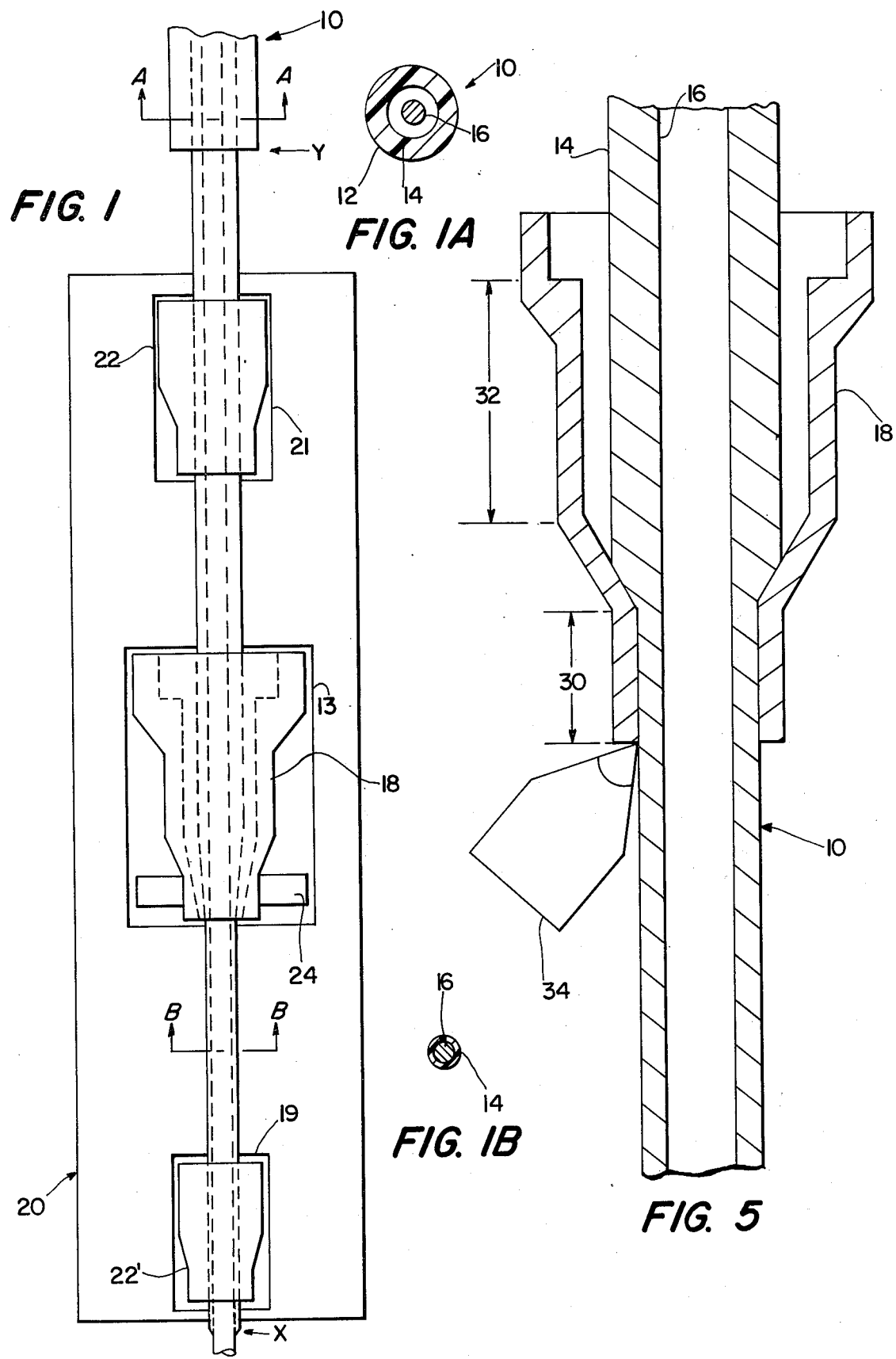
FIG. 1 shows a top view of the attachment tool with the optical fiber in place.
Figure 2:
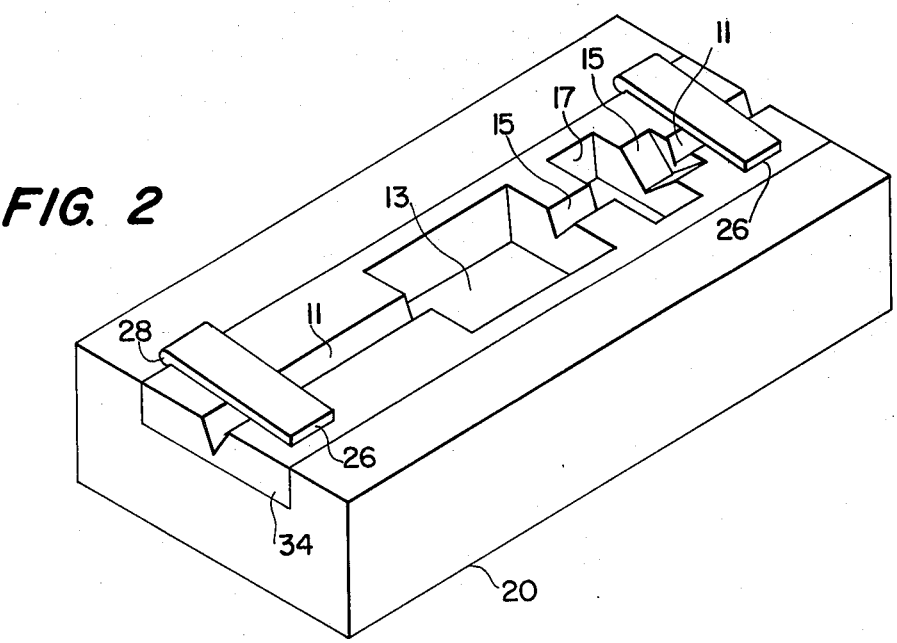
FIG. 2 shows an isometric view of a second embodiment of an attachment tool.

The components of one embodiment of an attachment means, the invention, is shown in FIG. 1. A block of rigid material 20, preferably metallic, is formed with grooves 11 (see FIG. 2) and one or more excised portions 13 on one surface. The embodiment shown in FIG. 1 has a central groove 11 and three excised portions, one (19 and 21) for each of the fiber holding means 22 and 22′ and one (13) for the connector 18 and heater 24. The grooves 11 and excised portions for a second embodiment are shown more clearly in FIG. 2.

An optical fiber 10 is stripped of its plastic coating 12 and cladding 14 for a short distance at one end. Then, for some distance thereafter, the fiber is stripped only of its outer coating 12, leaving plastic cladding 14 on the fiber core 16 (viz., from X to Y in FIG. 1). The fiber is then threaded through a first holder 22, a connector 18 and a second holder 22′. The holders 22 and 22′ have central boring which are somewhat larger than the fiber core 16 and its cladding 14, and are for the purpose of keeping the fiber substantially straight and at the proper level. They are placed in holes in the surface of the alignment block 20, which are excised to suitable depths for the dimensions of the holders and the connector so that the fiber core is substantially straight and centrally located in the connector tip when the holders and connector are in place on the block.

Another method for keeping the fiber straight is to preferentially etch a straight groove 11 to a depth which is appropriate for the particular fiber-cladding combination being used. An excision 13 is also made to fit the connector dimensions (see FIGS. 2, 3 and 4), the measurements of the excision and groove being designed so that the fiber is kept substantially straight and at the proper level to locate the fiber centrally in the bore of the connector tip section. A pair of pressure plates 26 is attached by hinges 28 to the block so that the plates can be lifted to insert the fiber in the groove. The plates are then lowered to keep the fiber in the groove. A third pressure plate (not shown in FIG. 2) can be mounted in a raised position so that, when lowered, it puts pressure on the tip section of the connector. There is an excision 15 in which the tip fits, and an excision 17 in the bottom of which the heater 24 is placed and through which the connector tip extends. The details are shown schematically in FIGS. 2, 3 and 4. In this embodiment, it is desirable to affix a silicon layer 34, or wafer, on the surface to be excised and grooved. The block, excisions, grooves, pressure plates and holders are simply for the purpose of aligning and holding the fiber straight and centrally in the connector while the connector tip is being heated and the cladded fiber core is being extruded. These items can therefore be designated collectively as an "attachment means". Other methods of retaining the fiber so that it does not move from a substantially straight position can be used.

Figure 3:
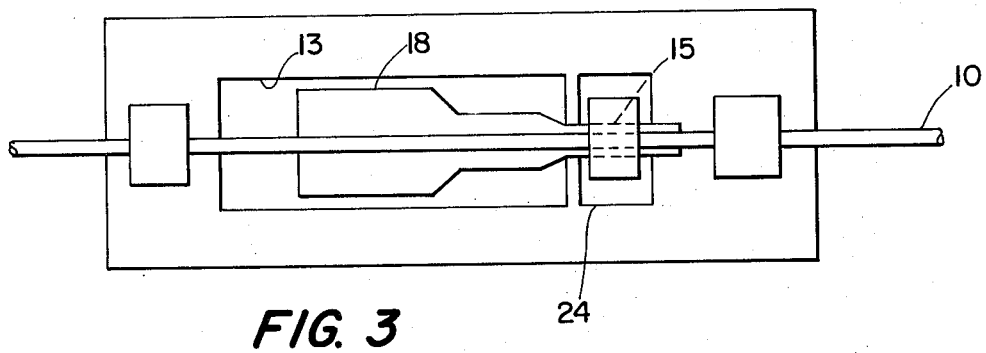
FIG. 3 shows, schematically, a top view of the embodiment in FIG. 2 with the connector and fiber in place.
Figure 4:
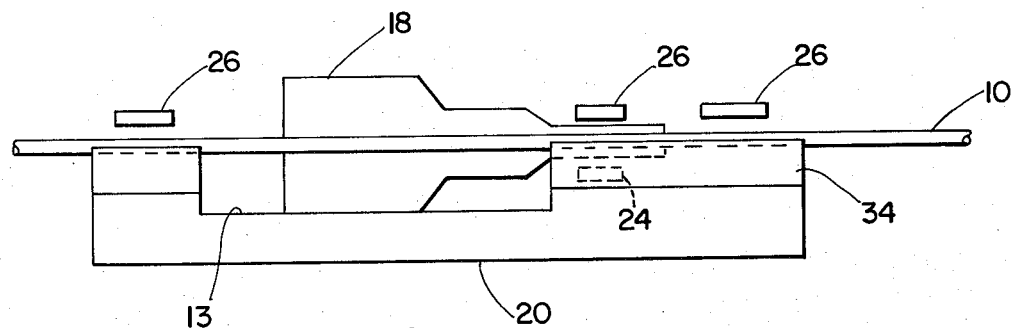
FIG. 4 shows, schematically, FIG. 3 in side view.

The connector 18, of which a more detailed view can be seen in FIG. 3, is of the type which flares out from a narrower portion 30 at one end to a somewhat wider diametral dimension through a median section 32. The fiber core and its cladding are too wide to pass through the tip section 30. To overcome this difficulty, a heater 24 is placed on or around the tip section and the heat softens the plastic cladding 14. The core and the softened cladding are then pulled through the narrow section. The heat is then turned off and the softened cladding cools and solidifies, bonding to the narrow connector tip section 30. The fiber is then cut off by a scribing tool 34, for example, at the end of the connector tip. If desired, plastic beads can be dropped into the other end of the connector and heated so that they bond the fiber to the rest of the connector 18.

Plastic coating can be removed from approximately 6–10 inches of the fiber and a steady fiber flow of approximately 10–20 inches is sufficient for a self-aligning effect to center the fiber in the tip. The self-alignment effect is due to the hydrodynamic centering forces generated within the heated connector tip by the motion of the fiber through the tip.

Although a specific type of inexpensive and readily available connector has been shown in the figures and in describing the invention, it should be apparent that the only requirements for a connector are that it should be of a rigid material which conducts heat so that the cladding can be softened, that the inside should be tubular, and that the inside diameter should be somewhat greater than the diameter of the fiber core so that the core can pass through the connector but somewhat less than the outside diameter of the core plus the cladding so that the cladding can be extruded by pulling the cladded core through the connector. Thus, a simple tube would suffice.

It should also be noted that the technique described herein applies to any type of fiber with a plastic cladding, whether or not an outside coating is used.

The block can be used in a horizontal or vertical position. The embodiment of FIG. 1 is preferably used in a vertical position and that in FIG. 2 preferably used in a horizontal position.

The advantages of the invention include the following:

1. The invention uses the fiber's own buffering material to provide alignment and sealing.
2. Epoxy may be externally introduced into the connector to provide a more permanent seal.
3. Various fiber sizes can be accommodated within a single-size connector.
4. A self-adjusting mechanism compensates for differences in connector wall thickness.
5. The self-sealing effect eliminates any possibility of fiber contamination.
6. The method permits simple fiber-end preparation and provides excellent mechanical protecion to the end of the fiber.
7. The cost is low.
8. Various types of fiber can be accommodated by the method.
9. Various types of outside housings for connectors can be accommodated.

It should be noted that although this invention has been described with reference to a specific type of fiber which has a glass central core, a plastic cladding and a plastic outer coating it is somewhat more general. It may be used with other types of optic fibers. For example, another type of optic fiber has a glass central core, a glass cladding and a plastic outer coating. In this case, the term "core" relative to the present invention would be the glass central core and the glass cladding, i.e., it would include the material which is surrounded by the plastic covering, which no longer serves as the cladding. This type of "core" and the central core of the fiber shown in FIG. 1 can both be termed a "cord" and this term will be used in the claims.

The word "plastic" is used herein to characterize material which softens when heated and hardens to substantially its original state when cooled.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method for attaching a connector to an optical fiber having a plastic-covered optical core, said connector having an inside diameter which is slightly smaller than the diameter of the covered core of the fiber and slightly greater than the diameter of the core alone, said method comprising the steps of:

forming a section of fiber containing only the fiber core;

forming an adjoining section of fiber containing the core and its covering;

threading the core of the fiber through said connector until the fiber is stopped at the covered section;

placing the fiber and connector in an attachment means so that the fiber is retained centrally of the connector and in a substantially straight position;

heating the connector so that the covering is softened;

extruding the softened covered fiber through the connector so that the softened covering extends at least to the far end of the connector opposite to that at which it was stopped and fills the space between the core and the connector wall;

allowing the covering to cool off;

cutting off the fiber flush with the far end of the connector.

* * * * *